US012634154B2

(12) United States Patent
Hawkins

(10) Patent No.: US 12,634,154 B2
(45) Date of Patent: May 19, 2026

(54) WEB PAGE CONFIGURATION USING CERTIFICATE CHAIN OF TRUST

(71) Applicant: Omnissa, LLC, Mountain View, CA (US)

(72) Inventor: Siavash James Joorabchian Hawkins, Tonbridge (GB)

(73) Assignee: Omnissa, LLC, Mountain View, CA (US)

( * ) Notice: Subject to any disclaimer, the term of this patent is extended or adjusted under 35 U.S.C. 154(b) by 215 days.

(21) Appl. No.: 18/381,425

(22) Filed: Oct. 18, 2023

(65) Prior Publication Data

US 2025/0132930 A1     Apr. 24, 2025

(51) Int. Cl.
*H04L 9/32* (2006.01)
*H04L 9/08* (2006.01)
*H04L 9/30* (2006.01)

(52) U.S. Cl.
CPC ............ *H04L 9/3265* (2013.01); *H04L 9/088* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 2002/0026427 A1* | 2/2002 | Kon | G06F 21/32 |
| | | | 705/67 |
| 2008/0249905 A1* | 10/2008 | Wong | G06Q 30/02 |
| | | | 709/224 |
| 2013/0145165 A1* | 6/2013 | Brown | H04M 1/72412 |
| | | | 713/176 |
| 2021/0119871 A1* | 4/2021 | Page | H04L 67/51 |
| 2023/0237171 A1* | 7/2023 | Shetty | G06F 21/604 |
| | | | 726/1 |
| 2023/0308442 A1* | 9/2023 | Lejin | H04L 9/3239 |

* cited by examiner

*Primary Examiner* — William J. Goodchild
(74) *Attorney, Agent, or Firm* — Kim & Stewart LLP

(57) ABSTRACT

Systems and methods are described for configuring a web page using chain of trust. In an example, a web browser can receive a certificate hierarchy from a web server in response to a request for a web page. The web browser can apply a hash algorithm to one or more digital security certificates in the certificate hierarchy. The web browser can send the hash values to a deployment database that stores mappings of known hash values to website configuration settings. The deployment database can respond with the corresponding configuration settings. The web browser can merge the configuration settings and apply them to the web page prior to rendering the web page on a display.

20 Claims, 5 Drawing Sheets

GENERATE A THUMBPRINT OF A CERTIFICATE HIERARCHY    110

REQUEST A DEPLOYMENT CONFIGURATION BASED ON THE THUMBPRINT    120

RECEIVE A DEPLOYMENT CONFIGURATION    130

APPLY THE DEPLOYMENT CONFIGURATION TO THE WEB PAGE    140

WEB PAGE CONFIGURATION USING CERTIFICATE CHAIN OF TRUST

BACKGROUND

A service provider, such as VMWARE, may have client application and software development kit ("SDK") components that connect to servers that are deployed by or for customers. Customization of client behavior may be necessary based on the specific customer or customer type deploying the server. For example, if a customer deploys their server in a specialized environment like GOVCLOUD, which is certified for Federal Risk and Authorization Management Program ("FedRAMP") high impact level, the client software may need to adapt accordingly. This adaptation could involve altering the transmission of analytic and operational data reports, directing them to a similarly deployed endpoint, or blocking them altogether. As an example, a government client may require that an endpoint server for analytic and operational data reports be located within the physical boundaries of the country. Some clients may also require certain features to be disabled, such as copying out or pasting in content.

Service providers rely on analytic and operational data reports for many reasons, such as identifying and resolving software issues and further product development. Solutions allowing a customer to choose whether to send such data may result in a significant drop in the data received, which can hinder efforts to fix and improve the product. Modifying the software code for each client is time-consuming and expensive.

As a result, a need exists for an improved method for modifying software client behavior.

SUMMARY

Examples described herein include systems and methods for configuring a web page using chain of trust. These examples leverage the role of website certificates in securing the communication between a user's web browser and a web server. For example, when a website owner wants to secure their website using Secure Sockets Layer/Transport Layer Security ("SSL/TLS") encryption, the owner obtains an SSL/TLS certificate from a trusted Certificate Authority ("CA"). The certificate contains key information about the website, such as its domain name, the owner's information, and a public key. SSL/TLS encryption uses a pair of keys: a public key and a private key. The public key is included in the SSL/TLS certificate and is used for encryption, while the private key is kept secret and is used for decryption. These keys work together to establish a secure connection.

When a user's web browser connects to a website with an SSL/TLS certificate, the server provides its certificate to the browser. The browser checks the certificate against a list of trusted CAs. If the certificate is issued by a trusted CA and hasn't expired, then the browser generates a symmetric encryption key and encrypts it with the server's public key. This encrypted key is sent to the server. The server uses its private key to decrypt the symmetric encryption key sent by the browser. Both the browser and the server now have the same symmetric encryption key, which they use to encrypt and decrypt data exchanged during the session. This ensures that data sent between them remains confidential and secure.

A website's certificate can include multiple certificates formed in a hierarchy. The certificate hierarchy of a web page refers to the chain of trust established by a series of digital certificates used to secure the connection between a user's web browser and a web server. This hierarchy ensures the authenticity and integrity of the SSL/TLS certificates used for encryption. At the top of the hierarchy is the root certificate authority. This is a highly trusted entity that issues and signs its own certificate. The root certificate is included in the operating systems and web browsers as a trusted root, creating the foundation of trust for the entire hierarchy. Some examples of highly trusted root CAs include DIGICERT, GLOBALSIGN, and GEOTRUST.

Below the root CA are intermediate certificate authorities. These CAs are also trusted by the root CA, and they issue and sign certificates for websites and organizations. Intermediate CAs are used to create a separation between the root CA and the certificates used directly on websites. If an intermediate CA's certificate is compromised, it can be revoked without affecting the trust in the root CA. A web server's certificate is issued and signed by an intermediate CA. This certificate includes the website's domain name, the server's public key, and other information. When a user's browser connects to a website, the server presents this certificate to the browser during the SSL/TLS handshake.

Service providers that a web application to clients can leverage the certificate hierarchy to customize the web page provided to each client. For example, a web page for a website can have a certificate hierarchy that is different for each (or specific) client. The website can be accessible through a managed web browser provided by the service provider. The service provider can configure the web browser to query a deployment database for a deployment configuration when a user accesses certain secure websites through the web browser. This can be done using a hash of the certificate hierarchy, or hashes of each certificate in the hierarchy.

For example, the deployment database can store mappings of hash values (referred to interchangeably hereinafter as "thumbprints") to deployment configurations. A deployment configuration can refer to configuration settings for a web page. For example, a deployment configuration can designate a specific endpoint for analytic and operational data reports, enable or disable features like copying out or pasting in data, and so on. In an example, when a managed web browser accesses a secure website, the managed browser can begin the process of securing a connection with the webserver described previously. The web browser can be configured to apply a hash algorithm to the certificate hierarchy, either in its entirety or to each individual certificate. The web browser can send the thumbprints (resulting hash values) to the deployment database in a request for a deployment configuration. The deployment database can locate any matching thumbprints and send their corresponding deployment configurations to the web browser. The web browser can apply the deployment configurations to the web page and render the web page on a display for the user.

In some examples, the web browser can merge configurations based on a set of rules. For example, when the web browser hashes multiple certificates, the corresponding deployment configurations may conflict with each other. The web browser can be configured to resolve such conflicts. For example, if one deployment configuration allows copying content out, but another restricts such an action, then the web browser can apply the more restrictive setting and block the feature that allows for copying content. In another example, different deployment configurations designate different endpoints for analytic and operational data reports, then the web browser can choose one endpoint or apply both. For example, the web browser can send analytic and operational data reports to both endpoints or, alternatively, can send analytic and operational data reports only to the endpoint designated by the deployment configuration of the higher-level certificate. The examples of merging deployment configurations described herein are merely exemplary and not meant to be limiting in any way.

In an example, a web browser can receive a certificate hierarchy from a web server in response to a request for a web page. The web browser can apply a hash algorithm to digital security certificates in the certificate hierarchy. The web browser can send the hash values to a deployment database that stores mappings of known hash values to website configuration settings. The deployment database can respond with the corresponding configuration settings. The web browser can merge the configuration settings and apply them to the web page prior to rendering the web page on a display.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
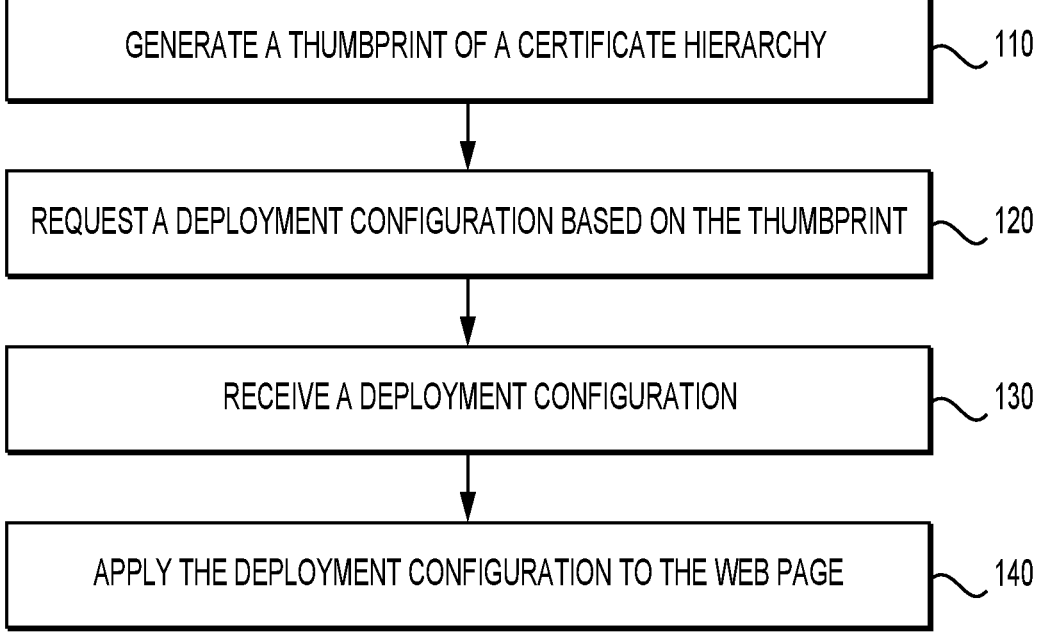
FIG. 1 is a flowchart of an example method for configuring a web page using chain of trust.

FIG. 1 is a flowchart of an example method for configuring a web page using chain of trust. At stage 110, a web browser can generate a thumbprint of a web page's certificate hierarchy. The web browser can be an application that accesses content on the internet. The certificate hierarchy of the web page can refer to the chain of trust established by a series of digital certificates used to secure the connection between a user's web browser and a web server. This hierarchy ensures the authenticity and integrity of the SSL/TLS certificates used for encryption.

The web browser can receive the certificate chain as part of a process for securely obtaining a web page document from a web server. For example, when a user enters a website's Uniform Resource Locator ("URL") or clicks on a link to a secure website (denoted by "https://" in the URL), the browser initiates a connection to the web server. As part of the connection process, the web server sends its SSL/TLS certificate to the browser. This certificate contains the server's public key, information about the website's domain, and other relevant information. The browser checks the received certificate to ensure its validity. The browser verifies the certificate's authenticity by checking whether it was issued by a trusted CA and whether it has not expired or been revoked. After verifying the certificate, the browser generates a symmetric encryption key and encrypts the key using the server's public key (from the certificate). The encrypted key is then sent to the server. The server uses its private key (corresponding to the public key in the certificate) to decrypt the encrypted symmetric encryption key sent by the browser. With both the browser and server now possessing the same symmetric encryption key, they can use it to encrypt and decrypt data exchanged during the session. This establishes a secure channel for data transmission.

The web browser can generate a thumbprint value by applying a hash algorithm to a whole certificate, which includes the certificate chain. The whole certificate can refer to all the public fields, including the signature and chain of trust, but not the private key. Any available hash algorithm can be used, such as Secure Hash Algorithm ("SHA")-1 or SHA-256. The whole certificate can include the certificate chain. The resulting hash is a value that uniquely identifies the whole certificate of the website.

An organization, such as an enterprise, can maintain a list of known hashes, which can be used to configure settings for web pages of certain websites or websites that share the same thumbprint. For example, website configuration settings can be created and stored in a database, and the configuration settings can be associated with thumbprint. Various configuration settings can be applied to a website based on its thumbprint. For example, a user can be prohibited from pasting content into a web page, copying data out of a web page, designating an endpoint for analytics data, and so on.

At stage 120, the web browser can request a deployment configuration based on the thumbprint. For example, the web browser can be configured to send the hash to a deployment database in a request for a deployment configuration. The deployment database can store deployment configurations for certain thumbprints. For example, an administrator ("admin") user can designate deployment configurations for websites based on their thumbprints using an admin console, and these deployment configurations can be saved to the deployment database. The web browser can request the deployment configuration using any appropriate communication protocol, such as an HTTPS call or an Application Programming Interface ("API") call.

If a deployment configuration for the thumbprint exists, then the deployment database can send the corresponding deployment configuration to the web browser, which the web browser can receive at stage 130. If deployment configuration exists for the thumbprint, then the deployment database can send a default configuration to the web browser. In an example, the deployment configuration can be a data file or an entry in a data table. As an example, the deployment configuration can be an Extensible Markup Language ("XML") file or a JavaScript Object Notation ("JSON") file. The deployment database can send the data file of the corresponding deployment configuration. Alternatively, the deployment database can extract the deployment configuration data and send the data as a payload in a communication call to the web browser, such as an API call or an HTTPS call.

At stage 140, the web browser can apply the deployment configuration to the web page. For example, the web browser can disable pasting or copying, or designate an analytics endpoint based on the deployment configuration. The web browser can then render the web page with the applied deployment configuration on the user's device.

Figure 2:
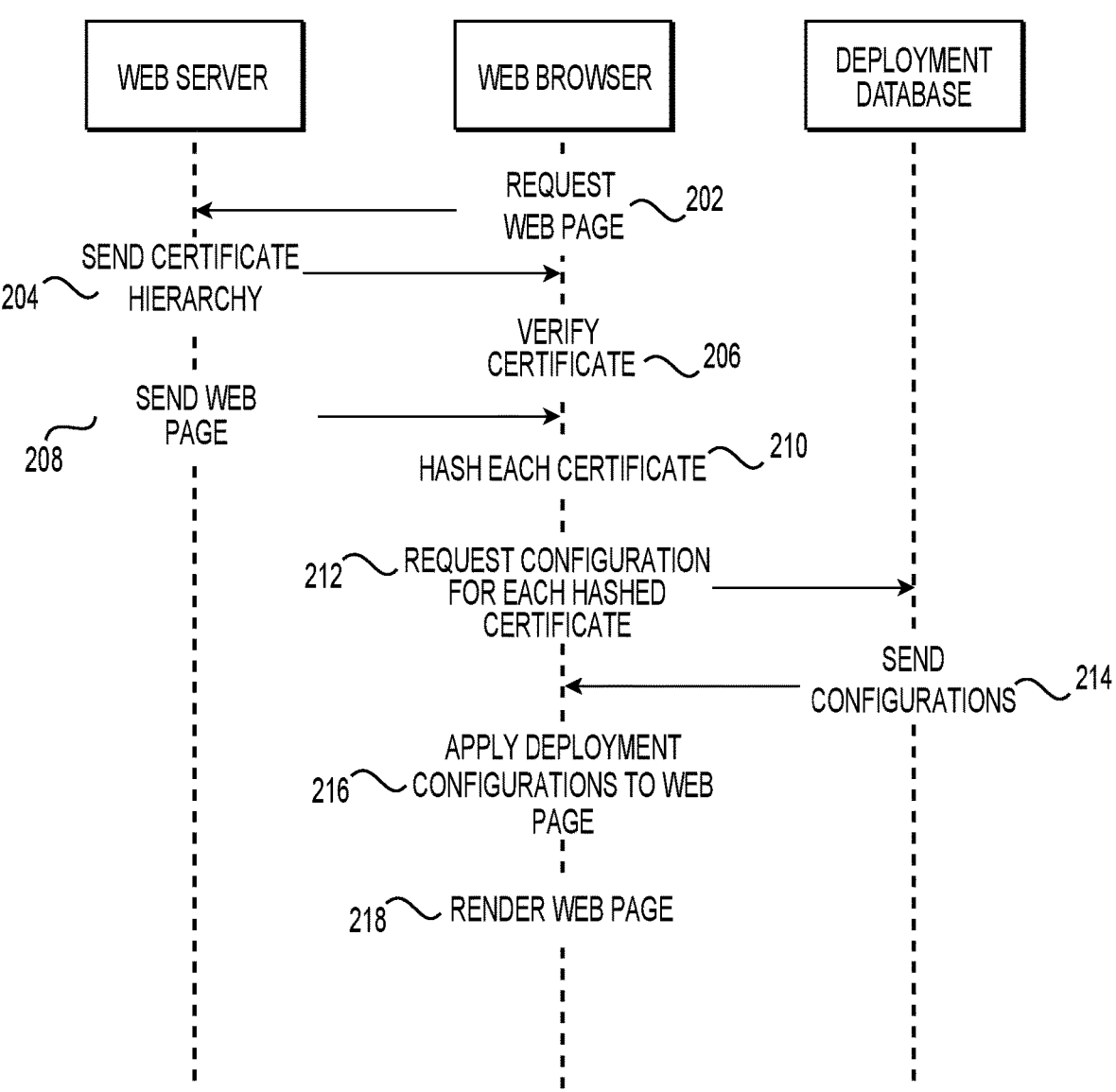
FIG. 2 is a sequence diagram of an example method for configuring a web page using chain of trust.

FIG. 2 is a sequence diagram of an example method for configuring a web page using chain of trust. At stage 202, a web browser can request a web page from a web server. For example, a user can enter a website's URL or click on a link to a secure website. The web browser can initiate a connection to the web server using the website's URL.

As part of the connection process, at stage 204, the web server sends its SSL/TLS certificate to the browser. This certificate can contain the server's public key, information about the website's domain, and other relevant details. In an example, the certificate can include a certificate hierarchy. The certificate hierarchy of a web page refers to the chain of trust established by a series of digital certificates used to secure the connection between the web browser and the web server. This hierarchy ensures the authenticity and integrity of the SSL/TLS certificates used for encryption.

The top of the hierarchy is the root certificate authority. This is a highly trusted entity that issues and signs its own certificate. The root certificate is included in the operating systems and web browsers as a trusted root, creating the foundation of trust for the entire hierarchy. Examples of root CAs include DIGICERT, GLOBALSIGN, and GEOTRUST. Below the root CA are intermediate certificate authorities. These CAs are also trusted by the root CA, and they issue and sign certificates for websites and organizations. Intermediate CAs are used to create a separation between the root CA and the certificates used directly on websites. If an intermediate CA's certificate is compromised, it can be revoked without affecting the trust in the root CA. The web server's certificate is issued and signed by an intermediate CA. This certificate includes the website's domain name, the server's public key, and other information. When a user's browser connects to a website, the server presents this certificate to the browser during the SSL/TLS handshake.

At stage 206, the web browser can verify the certificate. For example, the web browser can look in a list of trusted root CA certificates stored in the web browser. If the web browser finds match for the issuing CA of the certificate, that means that the certificate is trustworthy. The web browser can verify a certificate in other ways as well. For example, the web browser can ensure that a certificate has not expired, that a certificate has not been revoked, that the certificate matches the website's domain name, that a public key in the certificate corresponds to the private key used by the web server for encryption and decryption, and so on. The web browser can do this for each certificate in the certificate chain.

At stage 208, the web server can send the web page to the web browser. The web page can be a digital document that is part of a website and is accessible through a web browser over the internet. It can present content, such as text, images, videos, links, and interactive elements, to users in a structured format. The web page can be written using a markup language like HTML ("Hypertext Markup Language") and may include styling and layout instructions using CSS ("Cascading Style Sheets"). The web page can also contain scripts written in languages like JAVASCRIPT to add interactivity and dynamic behavior to the content.

The web server can send the web page to the web browser using a secure channel established by the certificate exchange and verification. For example, the web server can encrypt a digital document that includes the web page and send the digital document to the web browser using an appropriate communication protocol, such as HTTPS.

At stage 210, the web browser can hash the certificate. This can include the hashing all the certificates in the certificate chain. Hashing the certificate can mean applying a hash algorithm to the certificate. For example, the web browser can hash the certificate using SHA-1 or SHA-256.

At stage 212, the web browser can request a deployment configuration from the deployment database using the hashed certificate. For example, the web browser can send the hash to a deployment database that stores known hashes that map to deployment configurations. The deployment database can use the mappings to identify a deployment configuration corresponding to the hashed certificate. At stage 214, the deployment database can send the corresponding deployment configuration to the web browser. If no matching hash is found, then the deployment database can respond by sending a default deployment configuration.

In an example, deployment configurations can be created through an admin console by an admin user. An admin console can be an interface that allows an admin user to create, modify, or remove website deployment configurations. Various configuration settings can be applied to a web page based on its thumbprint. For example, a user can be prohibited from pasting content into a web page, copying data out of a web page, designating an endpoint for analytics data, and so on. This allows an organization to customize the functionality of a web page based on its certificates.

As an example, the methods described herein can be implemented by an organization that provides device management services to multiple clients, such as a Unified Endpoint Management ("UEM") system. The UEM system can configure managed devices to collect analytics and/or telemetry data and report this data to the UEM system or another system. If a particular client does not want some or all of the analytics data to be reported to external systems, then web applications provided to the client by the UEM system can reconfigured based on their certificate chain. For example, when a user of the client accesses a web application provided by the UEM system, a different or extra intermediary CA can be used to provide a certificate for the web page. This creates a unique certificate hierarchy for the web application when accessed by a user of the client. An admin user can create a deployment configuration that changes the endpoint for analytics data, and that deployment configuration can be mapped to the hash value that will result from hashing the unique certificate hierarchy. As a result, web browsers of the client's users will send analytics data to the designated endpoint rather than the default endpoint.

In an example, the deployment configuration can be a data file or an entry in a data table. As an example, the deployment configuration can be an XML file or a JSON file. The deployment database can send the data file of the corresponding deployment configuration. Alternatively, the deployment database can extract the deployment configuration data and send the data as a payload in a communication call to the web browser, such as an API call or an HTTPS call.

At stage 216, the web browser can apply the deployment configuration to the web page. For example, prior to visually rendering the web page, the web browser can modify the digital document of the web page. In one example, this can include restricting JAVASCRIPT execution to prevent a user from performing certain functions, such as copying out content or pasting in content. In another example, the web browser can restrict or disable certain plugins or extensions. In another example, the web browser can modify the endpoint address for analytics data.

At stage 218, the web browser can render the web page. For example, the web browser can parse the HTML code in the web page document and construct a Document Object Model ("DOM") that represents the structure of the page's elements, such as headings, paragraphs, images, and links. The web browser can load external resources and load any CSS stylesheets. The web browser can render the final DOM onto a display, such as a display of a user device.

Figure 3:
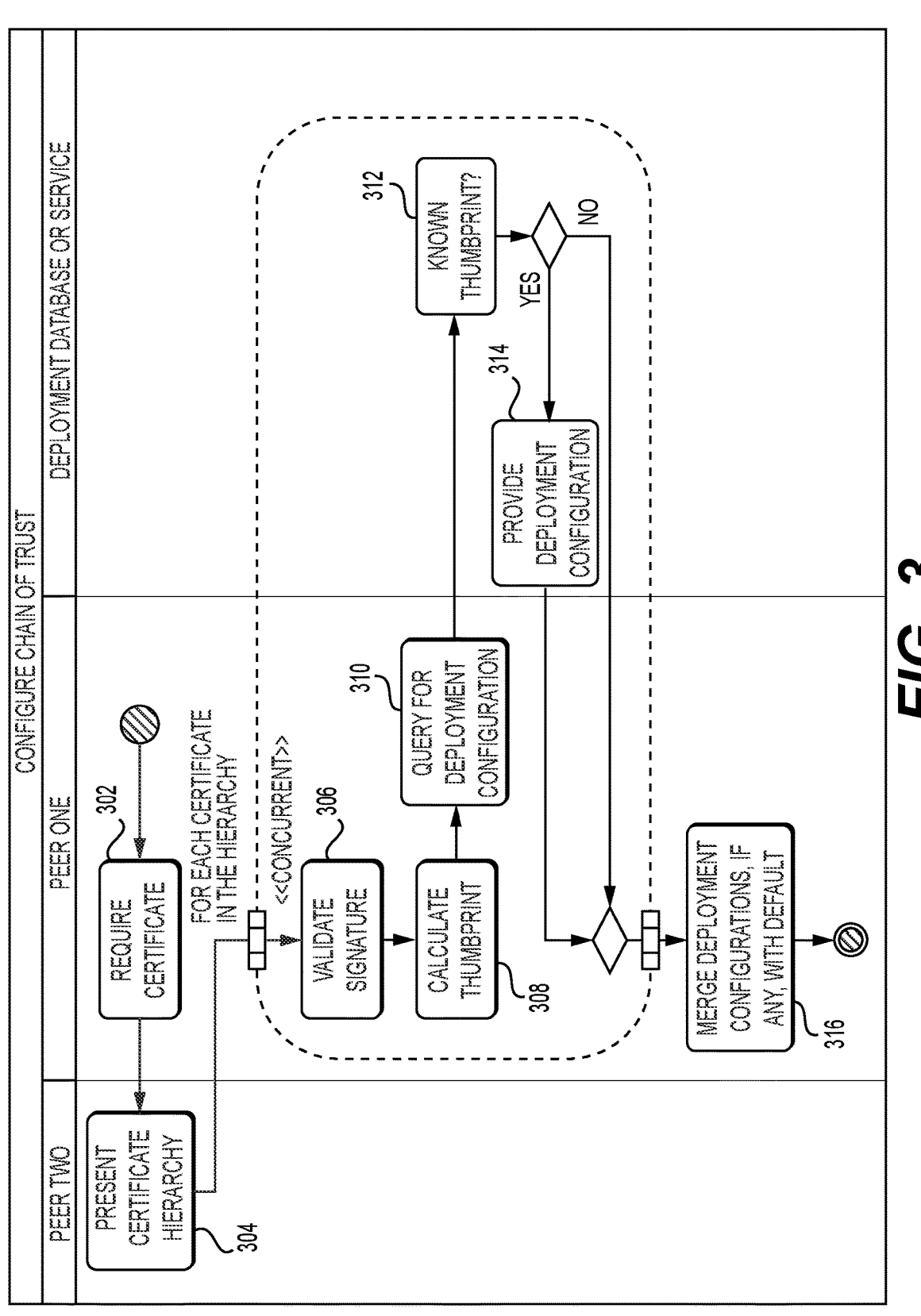
FIG. 3 is another flowchart of an example method for configuring a web page using chain of trust.

FIG. 3 is another flowchart of an example method for configuring a web page using chain of trust where each certificate is hashed rather than the entire certificate hierarchy. This allows for customization of a web site based on individual certificates. At stage 302, a web browser can request a certificate from a web server. For example, a user can enter a website's URL or click on a link to a secure website on the web browser, and the corresponding URL can direct to the web server. The web browser can initiate a connection to the web server.

At stage 304, the web server can present a certificate hierarchy to the web browser. The certificate hierarchy can include a chain of trust established by a series of digital certificates used to secure the connection between the web browser and the web server. In an example, the certificate hierarchy can include a root CA that is a highly trusted entity that issues and signs its own certificate. The root certificate can establish a foundation of trust for the entire hierarchy. The certificate hierarchy can also include intermediate CAs that are also trusted by the root CA. The certificate hierarchy can include a certificate of the web server that is issued and signed by an intermediate CA.

After receiving the certificate hierarchy, the web browser can retrieve a deployment configuration for each certificate in stages 306 to 314. At stage 306, the web browser can validate the signature of a certificate in the certificate hierarchy. For example, the web browser can extract information from the certificate, such as the website's domain name, the issuer (CA), the certificate's validity period, and the public key. The web browser already has the public key of trusted CAs pre-installed as part of the browser's Certificate Trust Store. The browser uses the CA's public key to verify the digital signature of the certificate. The digital signature is a cryptographic hash of the certificate data, encrypted with the CA's private key. By decrypting the signature with the CA's public key and comparing it to a newly generated hash of the certificate data, the browser can ensure that the certificate has not been tampered with and was indeed issued by the CA.

At stage 308, the web browser can calculate a thumbprint of the certificate. As described previously, the term "thumbprint" refers to a hash value resulting from applying a hash algorithm to a certificate. For example, the web browser can apply a hash algorithm to the certificate, such as SHA-1 or SHA-256. The hashed data can include all the public fields, including the signature and chain of trust, but not the private key.

At stage 310, the web browser can query the deployment database for a deployment configuration. The query can include the hash value corresponding to the individual certificate. At stage 312, the deployment database can determine whether the thumbprint is known. For example, the deployment database can store mappings of known hash values to deployment configurations. The deployment database can receive the hash value and try to locate a matching hash value. If no matching hash value is found, then, in one example, the deployment database can notify the web browser. The web browser can then render the web page as is or apply a default configuration deployment saved in the browser. In an alternative example, the deployment database can send a default deployment configuration to the web browser when no matching hash value exists. If a matching hash value does exist in the deployment database, then, at stage 314, the deployment database can provide the deployment configuration to the web browser.

In an example, the deployment configuration can be a data file or an entry in a data table. As an example, the deployment configuration can be an XML file or a JSON file. The deployment database can send the data file of the corresponding deployment configuration. Alternatively, the deployment database can extract the deployment configuration data and send the data as a payload in a communication call to the web browser, such as an API call or an HTTPS call.

The web browser can repeat stages 306 to 314 for each certificate in the certificate hierarchy. In an example, the web browser can cache each deployment configuration until all configurations have been received. Then, at stage 316, the web browser can merge deployment configurations. In one example, this can include applying configuration settings from all the received deployment configurations. In another example, the web browser can apply the settings in a hierarchal manner. In one such example, the web browser can apply the settings based on the certificate hierarchy. For example, settings from a higher-level certificate in the certificate hierarchy can override conflicting settings from lower-level certificates. As an example, a first certificate can map to a setting that designates a first analytics endpoint, and a second certificate can map to a setting that designates a second analytics endpoint. In such a case, the web browser can set the analytics endpoint designated in the deployment configuration of the higher certificate. In another example, the configurations themselves might exhibit a hierarchical arrangement. For example, specific values associated with particular a setting can take precedence over other values linked to the same setting. As an example, a certain certificate can be associated with a configuration that disallows data extraction, yet other certificates situated at higher levels in the hierarchy can correspond to a configuration permitting data extraction. Despite the permissions granted by these higher-level certificates, the browser can be set up to prevent data copying due to the presence of a certificate in the hierarchy configured to block such actions.

The example method above allows for a more customized approach to web site configuration using a certificate chain of trust. For example, an organization can place additional restrictions on a website or a web application by adding a higher-security CA to the website's chain of trust. As an example, analytics data for an organization can be sent to a default endpoint, such as a UEM provider or a third party. For higher security websites, the organization can add a higher-level certificate in the hierarchy and add a hash mapping to the deployment database to send the data to a different analytics endpoint.

Figure 4:
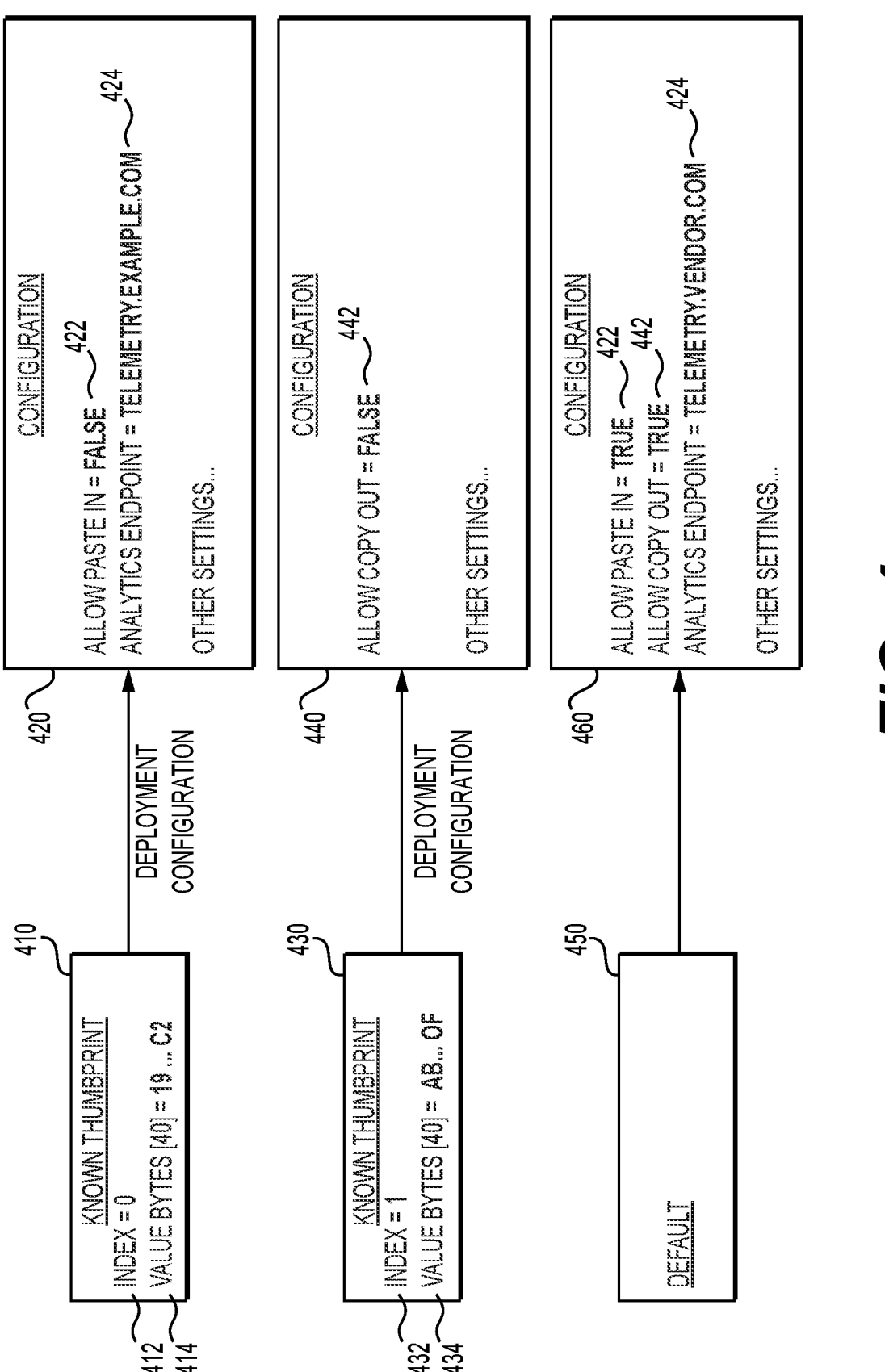
FIG. 4 is an illustration of example deployment configurations for a web page.

FIG. 4 is an illustration of an example diagram of example deployment configuration mappings for a website. As shown, deployment configuration 420 corresponds to identifier 410, deployment configuration 440 corresponds to identifier 430, and deployment configuration 460 corresponds to identifier 450. Identifiers 410 and 430 correspond to known thumbprints for which customized deployment configurations 420 and 440 have been created. Identifier 450 corresponds to a default customization represented by deployment configuration 460.

In an example, the deployment configurations 420, 440, and 460 can be data files, such as XML files or a JSON files.

The identifiers 410, 430, and 450 can map to the data files of their corresponding deployment configurations 420, 440, and 460. In another example, the identifiers 410, 430, and 450 and deployment configurations 420, 440, and 460 can be entries in a data table.

The identifier 410 includes an index value 412 and a thumbprint value 414. Similarly, the identifier 430 includes an index value 432 and a thumbprint value 434. The index values 412, 432 can correspond to an entry number in a database. The thumbprint values 414, 434 can be hash of a website's certificate. When a deployment database receives a request for a deployment configuration, the request can include a hash, and the deployment database can identify the corresponding deployment configuration using the hash. For example, if a deployment configuration request includes a thumbprint value that matches the thumbprint value 414, then the deployment database can respond with the deployment configuration 420. If a deployment configuration request includes a thumbprint value that matches the thumbprint value 434, then the deployment database can respond with the deployment configuration 440. If a deployment configuration request includes a thumbprint value for which there is no matching thumbprint value in the deployment database, then the deployment database can respond with the default configuration 460.

Deployment configurations can include various settings. For example, the deployment configurations 420 and 460 include an allow paste in setting 422. If the allow paste in setting 422 has a "true" value (like in the default deployment configuration 460), then users can paste content into the web page, but if the allow paste in setting 422 has a "false" value (like in the deployment configuration 420), then users are prohibited from pasting content into the web page. The deployment configurations 440 and 460 include an allow copy out setting 442. If the allow copy out setting 442 has a "true" value (like in the default deployment configuration 460), then users can copy content into the web page, but if the allow copy out setting 442 has a "false" value (like in the deployment configuration 440), then users are prohibited from copying content out of the web page.

The deployment configurations 420 and 460 include an analytics endpoint setting 424. The analytics endpoint setting 424 allows an organization to designate an endpoint for analytics data collected. For example, the default deployment configuration 460 includes a default analytics endpoint, "telemetry.vendor.com," which can send analytics data to a vendor. However, the deployment configuration 420 designates a different analytics endpoint of "telemetry.example.com." As a result, web pages with a certain combination of certificates (e.g., the certificate hierarchy creates a thumbprint corresponding to the hash value 414) send analytics data to a designated endpoint rather than a default endpoint.

The configuration settings described herein are merely exemplary and not meant to be limiting in any way. For example, a deployment configuration can modify any settings for a web page that can be modified.

Figure 5:
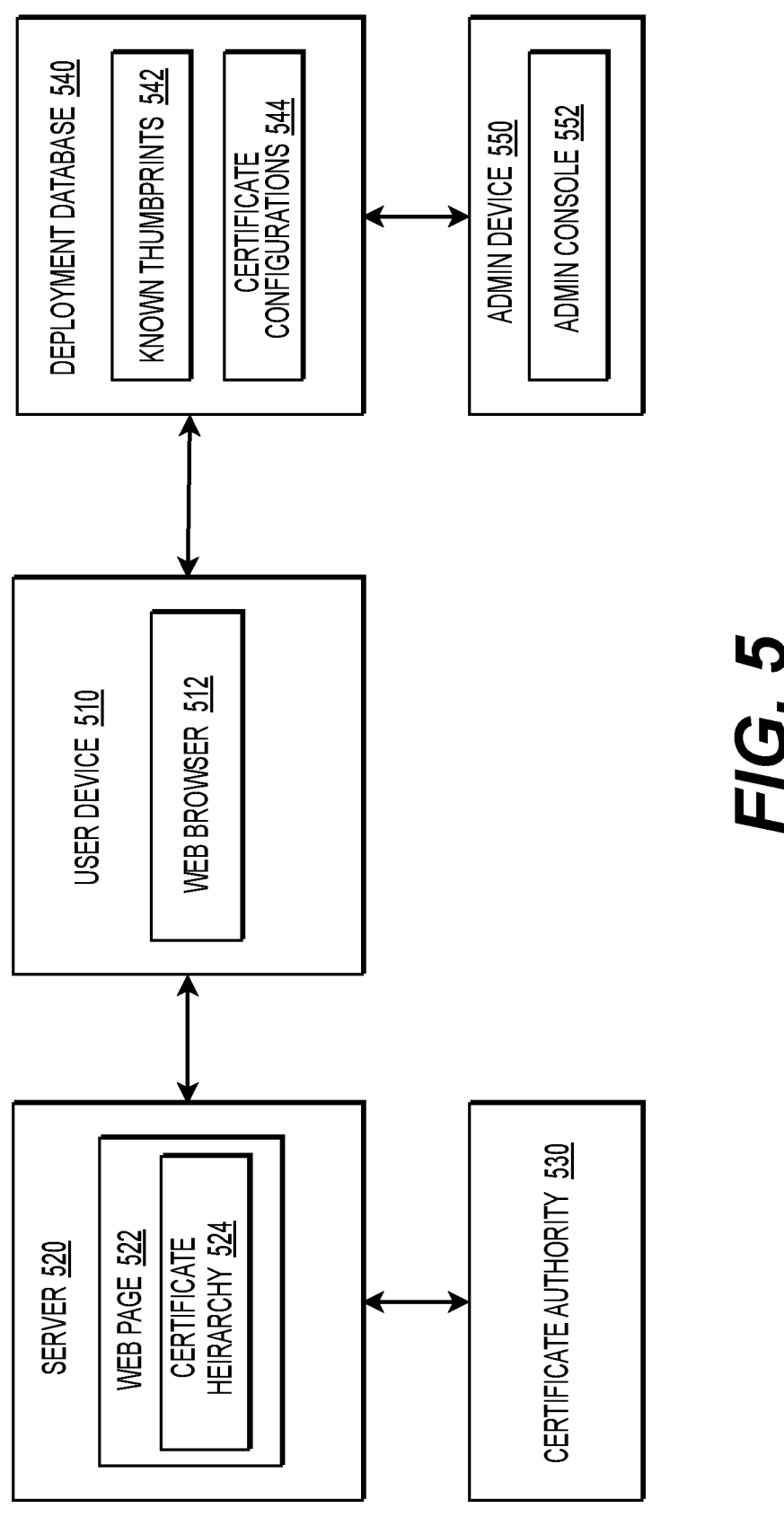
FIG. 5 is an illustration of an example system for configuring a web page using chain of trust.

FIG. 5 is an illustration of an example system for configuring a web page using chain of trust. A user device 510 can include a web browser 512. The user device 510 can be one or more processor-based devices, such as a personal computer, tablet, or cell phone. The web browser 512 can be an application that accesses content on the internet. A user can enter a website's URL into the web browser 512 or click on a link to a secure website to access a secure website. When the web browser 512 sends a request for a specific web page 522 or resource, a web server 520 processes the request, retrieves the requested content, and sends it back to the web browser 512, which then displays the content to the user. The web server 520 can be a software application or a hardware device that serves as a central repository for storing, managing, and delivering web content, such as web pages, images, videos, and other files, to users over the internet. The web browser 512 and web server 520 can communicate using any appropriate communication protocol, such as HTTP or HTTPS.

The web server 520 can retain a certificate hierarchy 524 for the web page 522. The certificate hierarchy 524 can be a chain of trust established by a series of digital certificates used to secure the connection between a web browser and a web server. The certificate hierarchy 524 can include various levels of security certificates, such as a root certificate signed by a CA 530 that is a highly trusted entity and various intermediary certificates signed by other CAs 530 that are trusted by the root CA 530. The CA 530 can be a trusted entity that issues digital certificates used in various security protocols to verify the authenticity and identity of individuals, organizations, or devices in the digital realm. These digital certificates contain information such as the entity's public key, identity details, and a digital signature from the CA 530 itself.

When the web browser 510 receives a certificate hierarchy 524 for a web page 522, the web browser 510 can be configured to create a hash of the certificate hierarchy 524 and/or each certificate in the hierarchy 524. The web browser 510 can do this, for example, by applying a hash algorithm, such as SHA-1 or SHA-256. The web browser 510 can send the hash values to a deployment database 540. The deployment database 540 can be a database or service that manages website configuration settings that are mapped to hash values. When the web browser 510 sends a hash value (thumbprint) to the deployment database 540, the deployment database 540 can check the hash value against a list of known thumbprints 542. If a match is found, the deployment database 540 can respond to the web browser 512 with a corresponding deployment configuration 544. The web browser 512 can then configure the web page according to the deployment configuration 544.

In an example, the deployment configuration can be a data file or an entry in a data table. As an example, the deployment configuration can be an XML file or a JSON file. The deployment database can send the data file of the corresponding deployment configuration. Alternatively, the deployment database can extract the deployment configuration data and send the data as a payload in a communication call to the web browser, such as an API call or an HTTPS call.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for configuring a web page, comprising:

transmitting, by a web browser to a web server, a request for a web page;

receiving, by the web browser from the web server, a first digital certificate in response to the request for the web page;

verifying, by the web browser, the first digital certificate received from the web server;

generating, by the web browser, a first thumbprint of the first digital certificate, the first thumbprint being a hash value resulting from applying a hash algorithm to the first digital certificate;

sending, by the web browser to a deployment database, a request to retrieve first configuration settings for the web page, the request to retrieve the first configuration settings including the first thumbprint;

receiving, from the deployment database, the first configuration settings corresponding to the first thumbprint, wherein the first configuration settings are mapped to the first thumbprint in the deployment database and wherein the first configuration settings are retrieved from the deployment database based on the first thumbprint;

applying the first configuration settings to the web page by the web browser; and rendering the web page to which the first configuration settings have been applied, in a display.

2. The method of claim 1, further comprising:

generating, by the web browser, a second thumbprint of a second digital certificate;

sending, by the web browser to the deployment database, a second request to retrieve second configuration settings, the second request including the second thumbprint;

receiving, from the deployment database, the second configuration settings corresponding to the second thumbprint;

merging the first configuration settings and the second configuration settings; and applying the merged configuration settings to the web page.

3. The method of claim 2, wherein merging the first configuration settings and the second configuration settings comprises:

determining that a first setting in the first configuration settings conflicts with a second setting of the second configuration settings;

determining that the first digital certificate is a higher security level of a certificate hierarchy of the web page than the second digital certificate; and based on the first digital certificate being a higher security level than the second digital certificate, applying the first setting to the web page and not the second setting.

4. The method of claim 1, wherein the first configuration settings designate an endpoint for analytics data.

5. The method of claim 1, wherein the first configuration settings include at least one of a restriction on pasting content into the web page and a restriction on copying content out of the web page.

6. The method of claim 1, wherein the first thumbprint is a hash value resulting from applying the hash algorithm to public fields of the first digital certificate.

7. The method of claim 1, wherein the first thumbprint is a hash value resulting from applying the hash algorithm to a certificate hierarchy of the web page.

8. A non-transitory, computer-readable medium containing instructions that, when executed by a hardware-based processor, causes the processor to perform stages for configuring a web page, the stages comprising:

transmitting, by a web browser to a web server, a request for a web page;

receiving, by the web browser from the web server, a first digital certificate in response to the request for the web page;

verifying, by the web browser, the first digital certificate received from the web server;

generating, by the web browser, a first thumbprint of the first digital certificate, the first thumbprint being a hash value resulting from applying a hash algorithm to the first digital certificate;

sending, by the web browser to a deployment database, a request to retrieve first configuration settings for the web page, the request to retrieve the first configuration settings including the first thumbprint;

receiving, from the deployment database, the first configuration settings corresponding to the first thumbprint, wherein the first configuration settings are mapped to the first thumbprint in the deployment database and wherein the first configuration settings are retrieved from the deployment database based on the first thumbprint;

applying the first configuration settings to the web page by the web browser; and rendering the web page to which the first configuration settings have been applied, in a display.

9. The non-transitory, computer-readable medium of claim 8, the stages further comprising:

generating, by the web browser, a second thumbprint of a second digital certificate;

sending, by the web browser to the deployment database, a second request to retrieve second configuration settings, the second request including the second thumbprint;

receiving, from the deployment database, the second configuration settings corresponding to the second thumbprint;

merging the first configuration settings and the second configuration settings; and applying the merged configuration settings to the web page.

10. The non-transitory, computer-readable medium of claim 9, wherein merging the first configuration settings and the second configuration settings comprises:

determining that a first setting in the first configuration settings conflicts with a second setting of the second configuration settings;

determining that the first digital certificate is a higher security level of a certificate hierarchy of the web page than the second digital certificate; and based on the first digital certificate being a higher security level than the second digital certificate, applying the first setting to the web page and not the second setting.

11. The non-transitory, computer-readable medium of claim 8, wherein the first configuration settings designate an endpoint for analytics data.

12. The non-transitory, computer-readable medium of claim 8, wherein the first configuration settings include at least one of a restriction on pasting content into the web page and a restriction on copying content out of the web page.

13. The non-transitory, computer-readable medium of claim 8, wherein the first thumbprint is a hash value resulting from applying the hash algorithm to public fields of the first digital certificate.

14. The non-transitory, computer-readable medium of claim 8, wherein the first thumbprint is a hash value resulting from applying the hash algorithm to a certificate hierarchy of the web page.

15. A system for configuring a web page, comprising:

a memory storage including a non-transitory, computer-readable medium comprising instructions; and a hardware-based processor that executes the instructions to carry out stages comprising:

transmitting, by a web browser to a web server, a request for a web page;

receiving, by the web browser from the web server, a first digital certificate in response to the request for the web page;

verifying, by the web browser, the first digital certificate received from the web server;

generating, by the web browser, a first thumbprint of the first digital certificate, the first thumbprint being a hash value resulting from applying a hash algorithm to the first digital certificate;

sending, by the web browser to a deployment database, a request to retrieve first configuration settings for the web page, the request to retrieve the first configuration settings including the first thumbprint;

receiving, from the deployment database, the first configuration settings corresponding to the first thumbprint, wherein the first configuration settings are mapped to the first thumbprint in the deployment database and wherein the first configuration settings are retrieved from the deployment database based on the first thumbprint;

applying the first configuration settings to the web page by the web browser; and rendering the web page to which the first configuration settings have been applied, in a display.

16. The system of claim 15, the stages further comprising:

generating, by the web browser, a second thumbprint of a second digital certificate;

sending, by the web browser to the deployment database, a second request to retrieve second configuration settings, the second request including the second thumbprint;

receiving, from the deployment database, the second configuration settings corresponding to the second thumbprint;

merging the first configuration settings and the second configuration settings; and applying the merged configuration settings to the web page.

17. The system of claim 16, wherein merging the first configuration settings and the second configuration settings comprises:

determining that a first setting in the first configuration settings conflicts with a second setting of the second configuration settings;

determining that the first digital certificate is a higher security level of a certificate hierarchy of the web page than the second digital certificate; and based on the first digital certificate being a higher security level than the second digital certificate, applying the first setting to the web page and not the second setting.

18. The system of claim 15, wherein the first configuration settings designate an endpoint for analytics data.

19. The system of claim 15, wherein the first configuration settings include at least one of a restriction on pasting content into the web page and a restriction on copying content out of the web page.

20. The system of claim 15, wherein the first thumbprint is a hash value resulting from applying the hash algorithm to public fields of the first digital certificate.

* * * * *